United States Patent
Guo

(10) Patent No.: US 10,642,093 B2
(45) Date of Patent: May 5, 2020

(54) DISPLAY PANEL, DISPLAY DEVICE, DISPLAY METHOD AND COLOR CONVERTOR

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Yuanhui Guo, Beijing (CN)

(73) Assignees: BOE TECHNOLOGY GROUP CO., LTD., Beijing (CN); HEFEI OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 189 days.

(21) Appl. No.: 15/758,178

(22) PCT Filed: Sep. 13, 2017

(86) PCT No.: PCT/CN2017/101537
§ 371 (c)(1),
(2) Date: Mar. 7, 2018

(87) PCT Pub. No.: WO2018/137350
PCT Pub. Date: Aug. 2, 2018

(65) Prior Publication Data
US 2019/0361292 A1 Nov. 28, 2019

(30) Foreign Application Priority Data

Jan. 24, 2017 (CN) .......................... 2017 1 0054911

(51) Int. Cl.
*G02F 1/1335* (2006.01)
*G02F 1/13357* (2006.01)

(52) U.S. Cl.
CPC .. *G02F 1/133528* (2013.01); *G02F 1/133602* (2013.01); *G02F 2001/133614* (2013.01)

(58) Field of Classification Search
CPC ..... G02F 1/133528; G02F 2001/01791; G02F 2001/133614; G02F 1/133617;
(Continued)

(56) References Cited

U.S. PATENT DOCUMENTS

2013/0135558 A1  5/2013  Kim et al.
2013/0341588 A1  12/2013  Jeon, II et al.
(Continued)

FOREIGN PATENT DOCUMENTS

CN   103135281 A   6/2013
CN   103514813 A   1/2014
(Continued)

OTHER PUBLICATIONS

International Search Report & Written Opinion dated Dec. 1, 2017, regarding PCT/CN2017/101537.

*Primary Examiner* — Paisley L Wilson
*Assistant Examiner* — Mariam Qureshi
(74) *Attorney, Agent, or Firm* — Intellectual Valley Law, P.C.

(57) ABSTRACT

The present disclosure provides a display device and display method. The display device includes: a first display structure and a second display structure. The second display structure is disposed on a first light exiting side of the first display structure. A quantum rod layer that is disposed on a second light exiting side of the second display structure. The first display structure is configured to convert an incident blue light ray into a linearly polarized blue light, and control a luminance of the first display structure by controlling a deflection angle of liquid crystal of the first display structure. The second display structure receives the linearly polarized
(Continued)

blue light that exits from the first display structure, and changes polarization state of the linearly polarized blue light incident to the quantum rod layer by controlling deflection angle of liquid crystal of the second display structure, to in turn change a color of the light ray that exits from the quantum rod layer.

20 Claims, 3 Drawing Sheets

(58) Field of Classification Search
CPC ........... G02F 2201/44; G02F 1/134363; G02F 2001/134372; G02B 5/30; G02B 27/28; H01L 51/502; H01L 31/035218; H01L 51/5012; H05B 33/00; G09G 2300/0434
See application file for complete search history.

(56) References Cited

U.S. PATENT DOCUMENTS

| | | |
|---|---|---|
| 2015/0009440 A1 | 1/2015 | Lee et al. |
| 2016/0300535 A1* | 10/2016 | Gilbert .................... G09G 3/36 |
| 2016/0320664 A1 | 11/2016 | Kang et al. |
| 2017/0123128 A1* | 5/2017 | Wu .......................... G02B 1/02 |
| 2017/0235174 A1 | 8/2017 | Guo et al. |
| 2019/0033632 A1* | 1/2019 | Lee ....................... G02F 1/1323 |

FOREIGN PATENT DOCUMENTS

| | | |
|---|---|---|
| CN | 105137655 A | 12/2015 |
| CN | 105527753 A | 4/2016 |
| CN | 106094316 A | 11/2016 |

* cited by examiner

DISPLAY PANEL, DISPLAY DEVICE, DISPLAY METHOD AND COLOR CONVERTOR

CROSS-REFERENCE TO RELATED APPLICATION

This application is a national stage application under 35 U.S.C. § 371 of International Application No. PCT/CN2017/101537, filed Sep. 13, 2017, which claims priority of the Chinese Patent Application No. 201710054911.6, entitled "DISPLAY PANEL AND DISPLAY METHOD" filed on Jan. 24, 2017, the disclosure of which is incorporated herein by reference in its entirety.

TECHNICAL FIELD

The present disclosure relates to the technical field of displaying, and particularly to a display device and display method.

BACKGROUND ART

Quantum rod display technique has outstanding advantages in color range coverage, accuracy, purities of RGB colors and so on, so it is deemed as a revolutionary technique in the field of displaying.

Quantum rods are semiconductor nanocrystals whose radiuses are approximately 0-20 nm and lengths are approximately scores of nanometers, and most of them are nanometer materials that consist of II-VI group or III-V group elements. Because of the quantum confinement effect, the transport of the electrons and holes in its interior is confined, so the continuous energy band structure becomes discrete energy level structures. When the sizes of the quantum rods are different, the degrees of the quantum confinement of the electrons and the holes are different, and the discrete energy level structures are different. When excited by external energy, quantum rods of different sizes emit lights of different wavelengths, which are lights of various colors.

As the display technique is rapidly developing, the requirements on displays by people are becoming increasingly higher, and it is a development orientation to utilize the quantum rod technique to realize better display effects.

SUMMARY

In a first aspect, the embodiments of the present disclosure provide a display panel. The display panel may include: a first display structure, comprising a first liquid crystal layer, a second display structure, on the first display structure, the second display structure comprising a second liquid crystal layer; and a quantum rod layer on a side of the second display structure distal to the first display structure. The first display structure is configured to convert an incident blue light ray into a linearly polarized blue light, and control a luminance of the first display structure by controlling deflection angles of liquid crystals in the first liquid crystal layer. The second display structure is configured to receive the linearly polarized blue light that exits from the first display structure, and change polarization state of the linearly polarized blue light incident to the quantum rod layer by controlling deflection angles of liquid crystals in the second liquid crystal layer, to change a color of the light ray that exits from the quantum rod layer.

The first display structure may include a plurality of first pixels, at least one first pixel consists of two subpixels. The second display structure may include a plurality of second pixels, at least one second pixel consists of two subpixels.

The quantum rod layer may include a red quantum rod unit and a green quantum rod unit. The red quantum rod unit may include a plurality of red quantum rods that are arranged in a preset direction. The green quantum rod unit may include a plurality of green quantum rods that are arranged in the preset direction.

When polarization directions of the linearly polarized blue lights that are incident to the red quantum rod unit and the green quantum rod unit are respectively perpendicular to arrangement directions of the quantum rods of the red quantum rod unit and the green quantum rod unit, both of the colors of the light rays that exit from the red quantum rod unit and the green quantum rod unit of the quantum rod layer are blue.

When polarization directions of the linearly polarized blue lights that are incident to the red quantum rod unit and the green quantum rod unit are respectively parallel to arrangement directions of the quantum rods of the red quantum rod unit and the green quantum rod unit, the color of the light ray that exits from the red quantum rod unit of the quantum rod layer is red, and the color of the light ray that exits from the green quantum rod unit of the quantum rod layer is green.

The first display structure comprises: a first substrate that is disposed on a first side of the first display structure; a second substrate that is disposed on a second side of the first display structure, wherein the second substrate is arranged oppositely to the first substrate; a first polarizer that is disposed on a first side of the first substrate; a second polarizer that is disposed on a second side of the second substrate; and a first electrode assembly that is provided between the first substrate and the second substrate. The first electrode assembly is used for controlling deflection angle of liquid crystal molecules of the first liquid crystal layer.

In one or more embodiments, the first electrode assembly comprises: a first pixel electrode and a first common electrode; and the first pixel electrode is disposed on the side of the first substrate that is facing the first liquid crystal layer, and the first common electrode is disposed on the side of the second substrate that is facing the first liquid crystal layer; or the first pixel electrode and the first common electrode are disposed on the side of the first substrate that is facing the first liquid crystal layer; or the first pixel electrode and the first common electrode are disposed on the side of the second substrate that is facing the first liquid crystal layer.

In one or more embodiments, the second display structure comprises: a third substrate that is disposed on a first side of the second display structure; a fourth substrate that is disposed on the second side of the second display structure, wherein the fourth substrate is arranged oppositely to the third substrate; and a second electrode assembly that is provided between the third substrate and the fourth substrate, for controlling deflection angle of liquid crystal molecules of the second liquid crystal layer.

In one or more embodiments, the second electrode assembly comprises: a second pixel electrode and a second common electrode; and the second pixel electrode is disposed on the side of the third substrate that is facing the second liquid crystal layer, and the second common electrode is disposed on the side of the fourth substrate that is facing the second liquid crystal layer.

In one or more embodiments, the second electrode assembly comprises: a second pixel electrode and a second common electrode; and the second pixel electrode and the second common electrode are disposed on the side of the third substrate that is facing the second liquid crystal layer.

In one or more embodiments, the second electrode assembly comprises: a second pixel electrode and a second common electrode; and the second pixel electrode and the second common electrode are disposed on the side of the fourth substrate that is facing the second liquid crystal layer.

In one or more embodiments, the second substrate also serves as the third substrate.

In one or more embodiments, the material of the quantum rod layer is any one or more selected from a group consisting of CdS, CdSe, CdTe, and ZnSe.

In a second aspect, a display device is provided that comprises the above display panel.

The display device may include a blue light backlight source to emit blue light to the first display structure.

In a third aspect, a display method is applied to the above display panel. The method may include: converting a blue light ray that is incident to the first display structure into a linearly polarized blue light, and controlling at least one deflection angle of liquid crystals in the first liquid crystal layer of the first display structure, thereby controlling the luminance of the first display structure; and receiving the linearly polarized blue light that exits from the first display structure, and controlling at least one deflection angle of liquid crystals in the second liquid crystal layer of the second display structure, thereby controlling the polarization state of the linearly polarized blue light that is incident to the quantum rod layer, to change a color of the light ray that exits from the quantum rod layer.

In one or more embodiments, the display method may further include: controlling the first display structure that comprises a plurality of first pixels, wherein at least one first pixel consists of two subpixels; and controlling the second display structure that comprises a plurality of second pixels, wherein at least one second pixel consists of two subpixels.

In one or more embodiments, converting a blue light ray that is incident to the first display structure into a linearly polarized blue light, and controlling the deflection angle of the liquid crystal of the first display structure, thereby controlling the luminance of the linearly polarized blue light that exits from the first display structure comprises: converting the blue light ray that is incident to the first display structure into a linearly polarized blue light by using the polarizer of the first display structure, and by controlling voltages of the first pixel electrode and the first common electrode of the first electrode assembly, controlling the deflection angles of the liquid crystals, thereby controlling the luminance of the linearly polarized blue light that exits from the first display structure.

In one or more embodiments, controlling the deflection angle of the liquid crystal of the second display structure, thereby controlling the polarization state of the linearly polarized blue light that is incident to the quantum rod layer, to in turn change a color of the light ray that exits from the quantum rod layer comprises: by controlling voltages of the second pixel electrode and the second common electrode of the second electrode assembly, controlling the deflection angle of the liquid crystal of the second display structure, thereby controlling the polarization state of the linearly polarized blue light that is incident to the quantum rod layer, to in turn change a color of the light ray that exits from the quantum rod layer.

In one or more embodiments, the quantum rod layer comprises a red quantum rod unit and a green quantum rod unit.

In one or more embodiments, controlling the deflection angle of the liquid crystal of the second display structure, thereby controlling the polarization state of the linearly polarized blue light that is incident to the quantum rod layer, to in turn change a color of the light ray that exits from the quantum rod layer comprises: controlling the liquid crystal of the second display structure that is corresponding to the red quantum rod unit to be deflected, to control a polarization direction of the linearly polarized blue light that is incident to the red quantum rod unit to be perpendicular to the arrangement direction of the quantum rods of the red quantum rod unit, whereby the light ray that exits from the red quantum rod unit is blue.

In one or more embodiments, controlling the deflection angle of the liquid crystal of the second display structure, thereby controlling the polarization state of the linearly polarized blue light that is incident to the quantum rod layer, to in turn change a color of the light ray that exits from the quantum rod layer comprises: controlling the liquid crystal of the second display structure that is corresponding to the red quantum rod unit to be deflected, to control a polarization direction of the linearly polarized blue light that is incident to the red quantum rod unit to be parallel to the arrangement direction of the quantum rods of the red quantum rod unit, whereby the light ray that exits from the red quantum rod unit is red.

In one or more embodiments, controlling the deflection angle of the liquid crystal of the second display structure, thereby controlling the polarization state of the linearly polarized blue light that is incident to the quantum rod layer, to in turn change a color of the light ray that exits from the quantum rod layer comprises: controlling the liquid crystal of the second display structure that is corresponding to the green quantum rod unit to be deflected, to control a polarization direction of the linearly polarized blue light that is incident to the green quantum rod unit to be perpendicular to the arrangement direction of the quantum rods of the green quantum rod unit, whereby the light ray that exits from the green quantum rod unit is blue.

In one or more embodiments, controlling the deflection angle of the liquid crystal of the second display structure, thereby controlling the polarization state of the linearly polarized blue light that is incident to the quantum rod layer, to change a color of the light ray that exits from the quantum rod layer comprises: controlling the liquid crystal of the second display structure that is corresponding to the green quantum rod unit to be deflected, to control a polarization direction of the linearly polarized blue light that is incident to the green quantum rod unit to be parallel to the arrangement direction of the quantum rods of the green quantum rod unit, whereby the light ray that exits from the green quantum rod unit is green.

In one or more embodiments, the method may further include mixing a red light ray that exits from the red quantum rod unit a green the light ray that exits from the green quantum rod unit to form a mixed light by controlling the deflection angle.

In a fourth aspect, a color convertor in a display panel is provided. The color convertor may include a display structure on the display panel comprising a liquid crystal layer; and a quantum rod layer on a side of the display structure distal to the display panel. The display panel is configured to convert an incident blue light ray into a linearly polarized blue light, and control a luminance of the first display structure. The display structure is configured to receive the linearly polarized blue light that exits from the display panel, and change polarization state of the linearly polarized blue light incident to the quantum rod layer by controlling deflection angles of liquid crystals in the liquid crystal layer, to change a color of the light ray that exits from the quantum rod layer.

Figure 1:
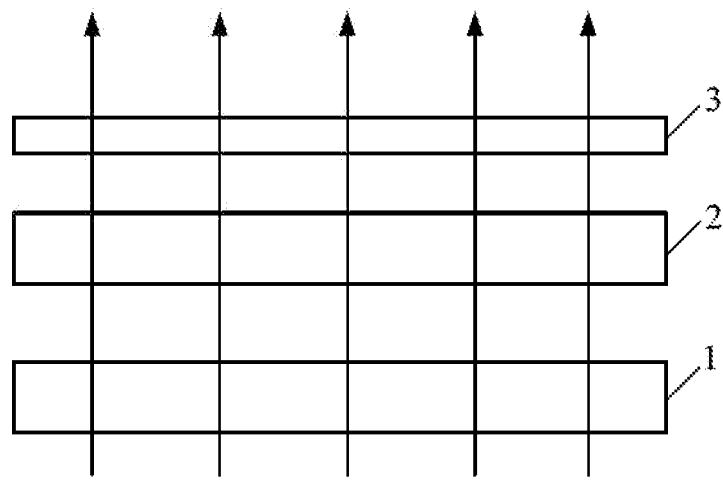
FIG. 1 is the schematic diagram of the structure of the display device of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF EMBODIMENTS

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

In order to make the technical problems to be solved, the technical solutions and the advantages of the present disclosure clearer, the present disclosure will be described below in detail in conjunction with the drawings and the special embodiments.

The embodiments of the present disclosure provide a display device, as shown by FIG. 1, the display panel comprises: a first display structure 1 and a second display structure 2, the second display structure 2 is disposed on the first light exiting side of the first display structure 1; and a quantum rod layer 3 that is disposed on the second light exiting side of the second display structure 2 (the material of the quantum rod layer 3 is any one or more selected from a group consisting of CdS, CdSe, CdTe and ZnSe);

the first display structure 1 is configured to convert an incident blue light ray into a linearly polarized blue light, and control the luminance of the first display structure 1 by controlling the deflection angle of the liquid crystal of the first display structure 1; and the second display structure 2 receives the linearly polarized blue light that exits from the first display structure, and changes the polarization state of the linearly polarized blue light incident to the quantum rod layer 3 by controlling the deflection angle of the liquid crystal of the second display structure 2, to in turn change the color of the light ray that exits from the quantum rod layer 3.

The display device of the present embodiment has two display structures having liquid crystal, wherein the first display structure, by the deflecting of its liquid crystal, controls the luminance of the linearly polarized blue light that exits from it, and in turn controls the luminance of the displayed screens. When the linearly polarized blue light passes through the second display structure, the second display structure controls the polarization state of the linearly polarized blue light that is incident to the quantum rod layer by the deflecting of its liquid crystal, so that the linearly polarized blue light can form corresponding colors after passing through the quantum rod layer. On the basis of the above design of the first display structure and the second display structure, the present embodiment finally realizes the color display solution of quantum rods.

The display device of the present embodiment will be described below in detail.

Figure 2:
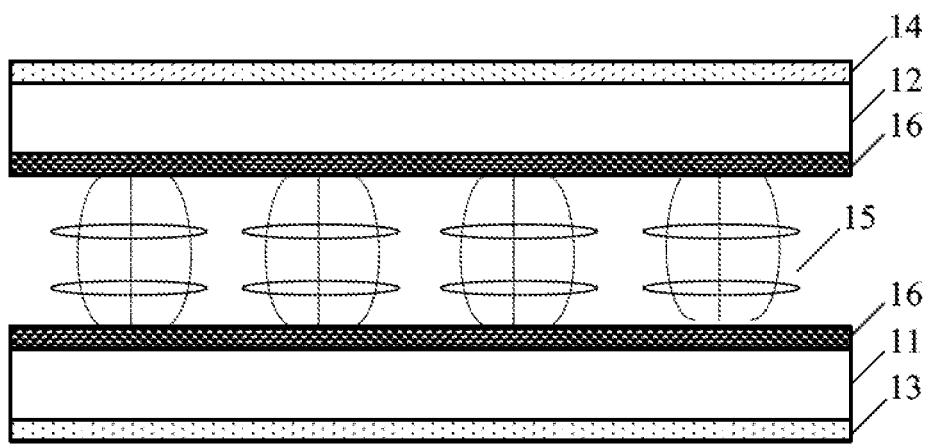
FIG. 2 is the schematic diagram of the structure of the first display structure of the display device of the present disclosure.

Particularly, as shown by FIG. 2, the first display structure of the present embodiment includes:

a first substrate 11 that is disposed on the light entering side of the first display structure;

a second substrate 12 that is disposed on the first light exiting side of the first display structure, wherein the second substrate is arranged oppositely to the first substrate;

a first polarizer sheet 13 that is disposed on the light entering side of the first substrate;

a second polarizer sheet 14 that is disposed on the second light exiting side of the second substrate;

a first liquid crystal layer 15 that is provided between the first substrate 11 and the second substrate 12; and a first electrode assembly 16 that is provided between the first substrate and the second substrate, for controlling the deflection angle of the liquid crystal molecules 15 of the first liquid crystal layer.

In that, the first polarizer sheet 13 and the second polarizer sheet 14 are used for converting a blue light ray (that is, the light ray that is incident to the first display structure) into a linearly polarized blue light. When the first electrode assembly loads a signal, it is configured to drive the liquid crystal molecules of the first liquid crystal layer 15 to be deflected, thereby influencing the luminance of the emergent linearly polarized blue light.

It should be noted that, the first electrode assembly 16 may be provided diversely, and as an example, in practical applications, the first electrode assembly 16 may include:

a first pixel electrode and a first common electrode;

wherein, the first pixel electrode and the first common electrode may be individually disposed on different substrates of the first display structure; for example, the first pixel electrode is disposed on the side of the first substrate 11 that is facing the first liquid crystal layer 15, and the first common electrode is disposed on the side of the second substrate 12 that is facing the first liquid crystal layer 15; or the first pixel electrode and the first common electrode may be disposed on the same substrate of the first display structure; for example, the first pixel electrode and the first common electrode are disposed on the side of the first substrate 11 that is facing the first liquid crystal layer 15, or the first pixel electrode and the first common electrode are disposed on the side of the second substrate 12 that is facing the first liquid crystal layer 15.

In that, the first pixel electrode corresponds to one pixel unit, and the first common electrode is a single block electrode; and the voltage values that are received by the first pixel electrode and the first common electrode are different.

Figure 3:
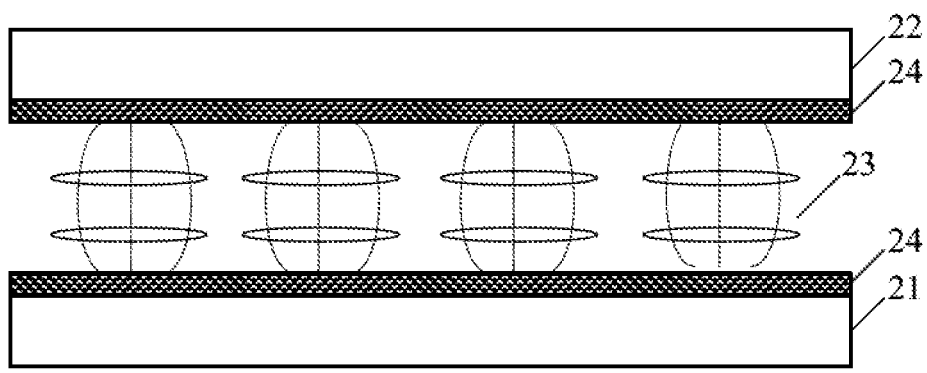
FIG. 3 is the schematic diagram of the structure of the second display structure of the display device of the present disclosure.

Correspondingly, as shown by FIG. 3, the second display structure of the present embodiment includes:

a third substrate 21 that is disposed on the light entering side of the second display structure;

a fourth substrate 22 that is disposed on the second light exiting side of the second display structure, wherein the fourth substrate 22 is arranged oppositely to the third substrate 21;

a second liquid crystal layer 23 is provided between the third substrate 21 and the fourth substrate 22; and a second electrode assembly 24 that is provided between the third substrate 21 and the fourth substrate 22, for controlling the deflection angle of the liquid crystal molecules of the second liquid crystal layer 23.

On the basis of the above structure, when the second electrode assembly 24 is loaded and driven, it controls the liquid crystal molecules of the second liquid crystal layer 23 to be deflected, and in turn controls the polarization state of the linearly polarized blue light. It can be known on the basis of the principle of the quantum rod display technique that, after the linearly polarized blue light is incident to the quantum rods, it can form the colors that are corresponding to its polarization states.

Furthermore, as is the same as the first electrode assembly, the second electrode assembly 24 of the present embodiment may also be provided diversely.

As an example, the second electrode assembly 24 may include: a second pixel electrode and a second common electrode.

In that, the second pixel electrode may be disposed on the side of the third substrate that is facing the second liquid crystal layer 23, and the second common electrode may be disposed on the side of the fourth substrate 22 that is facing the second liquid crystal layer 23; or the second pixel electrode and the second common electrode may be together disposed on the side of the third substrate 21 that is facing the second liquid crystal layer 23; or the second pixel electrode and the second common electrode may be together disposed on the side of the fourth substrate 22 that is facing the second liquid crystal layer 23.

In that, the second pixel electrode corresponds to one pixel unit, and the second common electrode is a single block electrode; and the voltage values that are received by the second pixel electrode and the second common electrode are different.

The above is the description on the structure of the display device of the present embodiment. It should be noted that, in practical applications, referring to FIG. 4, the second substrate 12 of the present embodiment may also serve as the third substrate 21, whereby the display device has a three-substrate structure, which is more simplified. Furthermore, although both of the first display structure and the second display structure of the present embodiment have the function of liquid crystal deflecting, their operation principles are different, wherein the former employs the liquid crystal deflecting to control the luminance of the light ray, and its emergent light ray has the polarization state after passing through the polarization film, and the latter controls the polarization state of the light ray by the liquid crystal deflecting.

The mode how the quantum rod layer conducts the color displaying will be described below in detail.

As an example, the quantum rod layer of the present embodiment includes a red quantum rod unit and a green quantum rod unit, wherein both of the red quantum rod unit and the green quantum rod unit include a plurality of quantum rods that are arranged in a preset direction. It can be known on the basis of the principle of the quantum rod displaying that, the quantum rods of the red quantum rod unit and the quantum rods of the green quantum rod unit have different diameters, whereby they can display their respective corresponding colors under the irradiation of the linearly polarized blue light.

Figure 5:
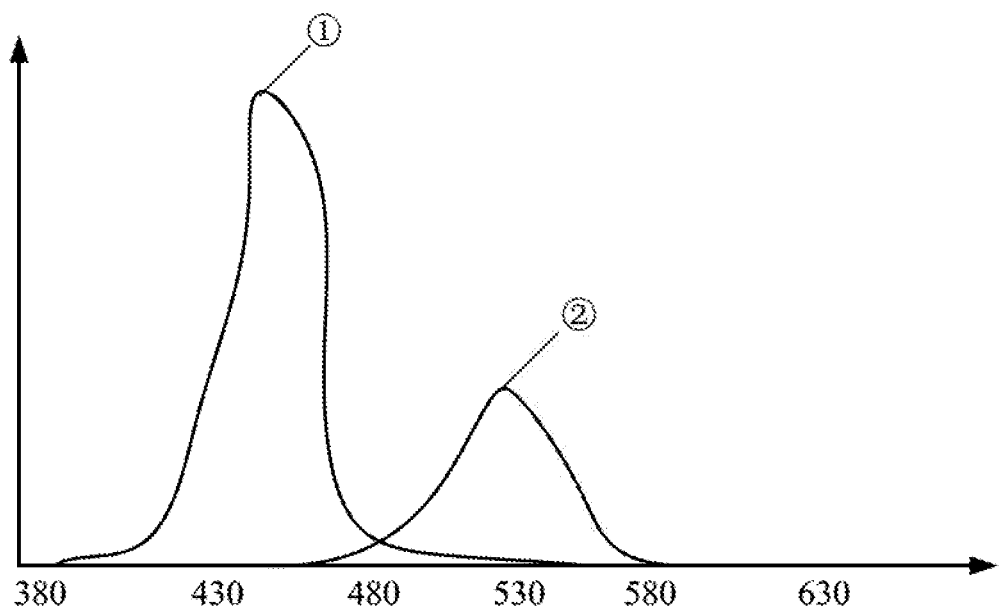
FIG. 5 is the luminescent spectrum diagram of the green quantum rod unit of the present disclosure after the linearly polarized blue light is incident.

Referring to FIG. 5, FIG. 5 shows the luminescent spectrum diagram of the green quantum rod unit after the linearly polarized blue light is incident, wherein the horizontal ordinates represent the wavelength of the light ray (nm), and the vertical coordinates represent the coefficient of luminous intensity. In that, the ① position represents that the polarization state of the linearly polarized blue light is perpendicular to the arrangement direction of the quantum rods of the green quantum rod unit, and the ② position represents that the polarization state of the linearly polarized blue light is parallel to the arrangement direction of the quantum rods of the green quantum rod unit.

Figure 6:
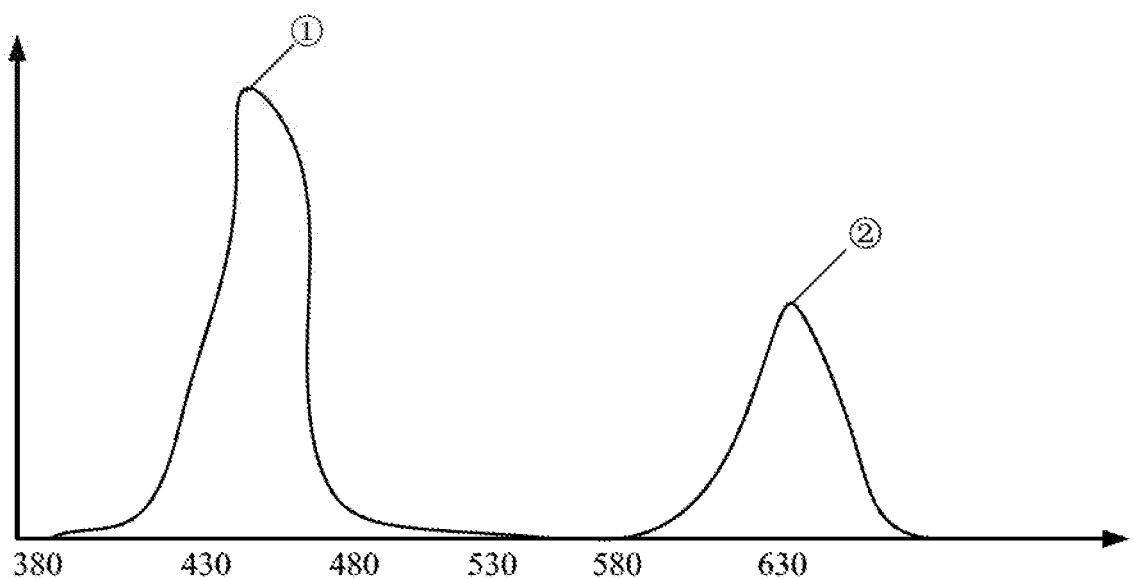
FIG. 6 is the luminescent spectrum diagram of the red quantum rod unit of the present disclosure after the linearly polarized blue light is incident.

Further, referring to FIG. 6, FIG. 6 shows the luminescent spectrum diagram of the red quantum rod unit after the linearly polarized blue light is incident, wherein the horizontal ordinates represent the wavelength of the light ray (nm), and the vertical coordinates represent the coefficient of luminous intensity. In that, the ① position represents that the polarization state of the linearly polarized blue light is perpendicular to the arrangement direction of the quantum rods of the red quantum rod unit, and the ② position represents that the polarization state of the linearly polarized blue light is parallel to the arrangement direction of the quantum rods of the red quantum rod unit.

It can be seen on the basis of FIG. 5 and FIG. 6 that:

when polarization directions of the linearly polarized blue lights that are incident to the red quantum rod unit and the green quantum rod unit are respectively perpendicular to arrangement directions of the quantum rods of the red quantum rod unit and the green quantum rod unit, both of the colors of the light rays that exit from the red quantum rod unit and the green quantum rod unit of the quantum rod layer are blue;

when polarization directions of the linearly polarized blue lights that are incident to the red quantum rod unit and the green quantum rod unit are respectively parallel to arrangement directions of the quantum rods of the red quantum rod unit and the green quantum rod unit, the color of the light ray that exits from the red quantum rod unit of the quantum rod layer is red, and the color of the light ray that exits from the green quantum rod unit of the quantum rod layer is green; and when polarization directions of the linearly polarized blue lights that are incident to the red quantum rod unit and the green quantum rod unit respectively form an angle that is not 90° with arrangement directions of the quantum rods of the red quantum rod unit and the green quantum rod unit, the colors of the light rays that exit from the red quantum rod unit and the green quantum rod unit of the quantum rod layer are intermediate colors between red and green.

In practical applications, the arrangement directions of the quantum rods of the red quantum rod unit and the green quantum rod unit of the present embodiment may be parallel to the transmission axis of the second polarizer sheet. Assuming that the liquid crystal of the second display structure does not influence the polarization state of the linearly polarized blue light that exits from the first display structure absolutely, when the linearly polarized blue light is incident to the red quantum rod unit, the red quantum rod unit may emit a red light ray; and when the linearly polarized blue light is incident to the green quantum rod unit, the green quantum rod unit may emit a green light ray.

Certainly, it should be noted that, the above arrangement directions of the quantum rods of the red quantum rod unit and the green quantum rod unit are merely illustrative description, and the arrangement directions of the quantum rods of the red quantum rod unit and the green quantum rod unit of the present embodiment are not exclusive. For example, the arrangement directions of the quantum rods of the red quantum rod unit and the green quantum rod unit may be perpendicular to the transmission axis of the second polarizer sheet. The present embodiment is merely required to change the polarization state of the linearly polarized blue light by the liquid crystal deflecting of the second display structure, and the present embodiment may also cause the red quantum rod unit to emit a red light ray and the green quantum rod unit to emit a green light ray. The arrangement direction of the quantum rods of the present embodiment is diverse, which will not be listed in further detail.

Apparently, it can be known from the above description that, the emergent light ray of the red quantum rod unit of the present embodiment may be red and the emergent light ray of the green quantum rod unit may be green, and when a blue light source is employed, as well known in the field of displaying, three basic colors of red, green and blue can be formed, which can be mixed into any color. Therefore, the present embodiment can realize the effect of color screen displaying.

In practical applications, the quantum rod unit has a plurality of red quantum rod units and green quantum rod units, wherein each of the red quantum rod units and each of the green quantum rod units correspond to one subpixel. On the basis of the above structure that, the disclosure can realize color displaying by merely using two basic subpixels, and compared with the displaying technical solution using three basic color subpixels of the prior art, the present disclosure has an advantage in the aperture ratio.

Furthermore, the display device of the present embodiment may also include: a blue light backlight source, wherein the blue light backlight source may be disposed on the light entering side of the first display structure.

In another aspect, the embodiments of the present disclosure further provide a display method that is applied to the display device, comprising:

converting a blue light ray that is incident to the first display structure into a linearly polarized blue light, and controlling the deflection angle of the liquid crystal of the first display structure, thereby controlling the luminance of the first display structure (that is, controlling the energy of the linearly polarized blue light that exits from the first display structure); and receiving the linearly polarized blue light that exits from the first display structure, and controlling the deflection angle of the liquid crystal of the second display structure, thereby controlling the polarization state of the linearly polarized blue light that is incident to the quantum rod layer, to in turn change a color of the light ray that exits from the quantum rod layer.

Apparently, the display method of the present embodiment can control the display device of the present disclosure to display a color screen with adjustable luminance.

Particularly, referring to the structure of the first display structure, which is provided by the present disclosure, the converting a blue light ray that is incident to the first display structure into a linearly polarized blue light, and controlling the deflection angle of the liquid crystal of the first display structure, thereby controlling the luminance of the linearly polarized blue light that exits from the first display structure includes:

converting the blue light ray that is incident to the first display structure into a linearly polarized blue light by using the polarizer sheet of the first display structure (comprising a first polarizer sheet and a second polarizer sheet), and by controlling voltages of the first pixel electrode and the first common electrode of the first electrode assembly, controlling the deflection angles of the liquid crystals, thereby controlling the luminance of the linearly polarized blue light that exits from the first display structure.

Particularly, referring to the structure of the second display structure, which is provided by the present disclosure, the controlling the deflection angle of the liquid crystal of the second display structure, thereby controlling the polarization state of the linearly polarized blue light that is incident to the quantum rod layer, to in turn change a color of the light ray that exits from the quantum rod layer includes:

by controlling voltages of the second pixel electrode and the second common electrode of the second electrode assembly, controlling the deflection angle of the liquid crystal of the second display structure, thereby controlling the polarization state of the linearly polarized blue light that is incident to the quantum rod layer, to in turn change a color of the light ray that exits from the quantum rod layer.

The display method of the present disclosure will be described below in detail.

Figure 4:
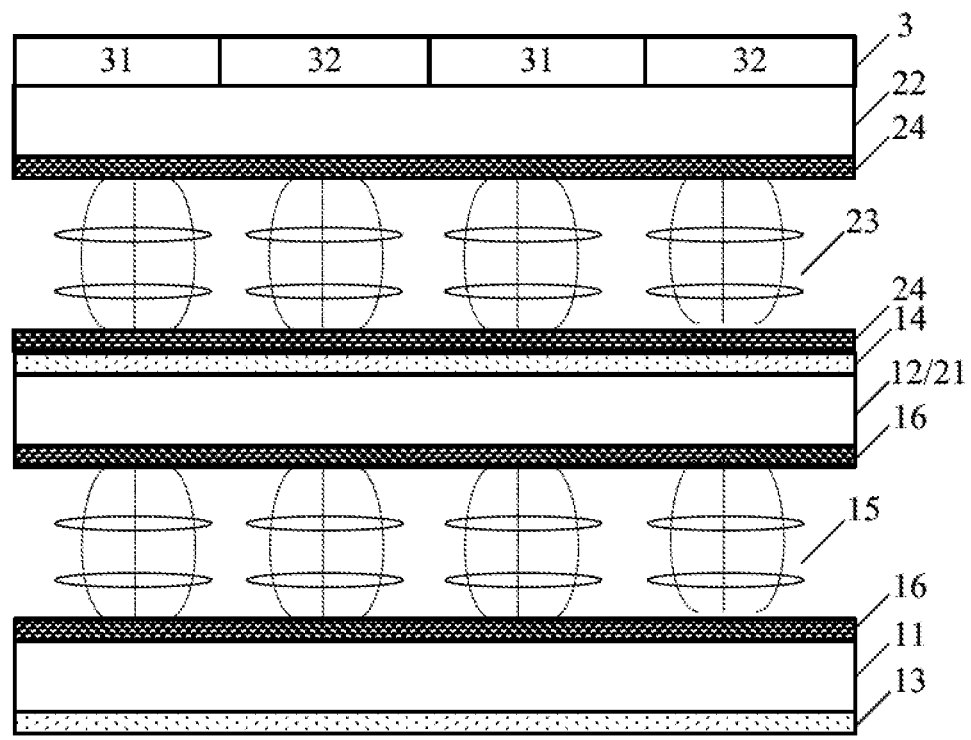
FIG. 4 is the schematic diagram of the detailed structure of the display device of the present disclosure.

As an example, the display device of the present disclosure is as shown by FIG. 4, wherein the quantum rod layer 3 includes a red quantum rod unit 31 and a green quantum rod unit 32.

In that, the controlling a luminance of the first display structure by controlling a deflection angle of liquid crystal of the first display structure may include:

controlling the liquid crystal 15 of the first display structure that is corresponding to the red quantum rod unit 31 to be deflected, thereby controlling the transmittance of the linearly polarized blue light that is incident to the red quantum rod unit 31 to the first display structure, and in turn controlling the luminance of the first display structure regarding the red quantum rod unit 31; and controlling the liquid crystal 15 of the first display structure that is corresponding to the green quantum rod unit 32 to be deflected, thereby controlling the transmittance of the linearly polarized blue light that is incident to the green quantum rod unit 32 to the first display structure, and in turn controlling the luminance of the first display structure regarding the green quantum rod unit 32.

In practical applications, the liquid crystal of the first display structure, after deflecting, can influence the transmittance of the blue light ray by the refraction principle. After the blue light ray exits from the first display structure, it has the polarization state due to the polarization film, whereby the linearly polarized blue light is formed, and the polarization state of the linearly polarized blue light is controlled by the second display structure, to determine the color after it exits from the quantum rod layer.

Correspondingly, the controlling the deflection angle of the liquid crystal of the second display structure includes:

controlling the liquid crystal 23 of the second display structure that is corresponding to the red quantum rod unit 31 to be deflected, thereby influencing the polarization state of the linearly polarized blue light that is incident to the red quantum rod unit 31, to control the color of the light ray that exits from the red quantum rod unit 31; and controlling the liquid crystal 23 of the second display structure that is corresponding to the green quantum rod unit 32 to be deflected, thereby influencing the polarization state of the linearly polarized blue light that is incident to the green quantum rod unit 32, to control the color of the light ray that exits from the green quantum rod unit 32;

wherein, the light ray that exits from the red quantum rod unit 31 and the light ray that exits from the green quantum rod unit 32 can form a mixed light, or as can be seen, the light ray that exits from the red quantum rod unit 31 and the light ray that exits from the green quantum rod unit 32 and the blue light source form a mixed light, and because the mixed light is formed by the mixing of basic color light rays, it can have any color.

Here it should be noted that, in the method of the present embodiment, although both of the liquid crystals of the first display structure and the second display structure are controlled to be deflected, the special effects are different. The liquid crystal of the first display structure is used for influencing the light ray color, while the liquid crystal of the second display structure is used for influencing the polarization state of the light ray. In practical applications, because of the different usages, the deflection angles of the liquid crystals of the first display structure and the second display structure are not necessarily the same.

In that, controlling the light ray luminance by the liquid crystal deflecting is a function of the existing display devices, which will not be illustrated herein with examples. The solutions how to control the polarization state of the light ray to control the color of the emergent light ray of the quantum rod layer will be illustratively described below by referring to practical applications.

According to FIG. 5 and FIG. 6, when a control circuit requires that the light ray that exits from the red quantum rod unit is blue, the method controls the liquid crystal of the second display structure that is corresponding to the red quantum rod unit to be deflected, to control a polarization direction of the linearly polarized blue light that is incident to the red quantum rod unit to be perpendicular to the arrangement direction of the quantum rods of the red quantum rod unit. When the control circuit requires that the light ray that exits from the red quantum rod unit is red, the method controls the liquid crystal of the second display structure that is corresponding to the red quantum rod unit to be deflected, to control a polarization direction of the linearly polarized blue light that is incident to the red quantum rod unit to be parallel to the arrangement direction of the quantum rods of the red quantum rod unit.

When a control circuit requires that the light ray that exits from the green quantum rod unit is blue, the method controls the liquid crystal of the second display structure that is corresponding to the green quantum rod unit to be deflected, to control a polarization direction of the linearly polarized blue light that is incident to the green quantum rod unit to be perpendicular to the arrangement direction of the quantum rods of the green quantum rod unit. When a control circuit requires that the light ray that exits from the green quantum rod unit is green, the method controls the liquid crystal of the second display structure that is corresponding to the green quantum rod unit to be deflected, to control a polarization direction of the linearly polarized blue light that is incident to the green quantum rod unit to be parallel to the arrangement direction of the quantum rods of the green quantum rod unit.

Further, in the liquid crystal deflecting, the display method conducts the controlling based on the red quantum rod unit 31 and the green quantum rod unit 32. Thus, the displaying is conducted on the basis of subpixels of two basic colors. Compared with the prior art, the present disclosure eliminates the subpixels of one basic color, and thus has a high aperture ratio, which brings a more delicate displaying effect.

In particular implements, the present embodiment can, by loading the driving signals of the corresponding voltages to the electrode assemblies of the first display structure and the second display structure, control the respective liquid crystals to be deflected.

As an example, assuming that both of the first display structure and the second display structure of the display device that is applied by the present embodiment are common FFS liquid crystal cells (or TN liquid crystal cells), and the directions of the transmission axes of the first polarizer sheet 13 and the second polarizer sheet 14 are perpendicular, when the saturation voltage that drives the liquid crystal 15 and 23 is set to be 5V, the polarization state of the linearly polarized blue light that is incident to the quantum rod layer 3 is changed, and when the initial voltage of the liquid crystals is 0V, the polarization state of the linearly polarized blue light that is incident to the quantum rod layer 3 is not changed.

When a red screen is to be displayed: the driving voltage of the liquid crystal of the second display structure that is corresponding to the red quantum rod unit 31 is 5V, the driving voltage of the liquid crystal of the second display structure that is corresponding to the green quantum rod unit 32 is 0V, the driving voltage of the liquid crystal of the first display structure that is corresponding to the red quantum rod unit 31 is 5V, and the driving voltage of the liquid crystal of the first display structure that is corresponding to the green quantum rod unit 32 is 0V.

When a green screen is to be displayed: the driving voltage of the liquid crystal of the second display structure that is corresponding to the red quantum rod unit 31 is 0V, the driving voltage of the liquid crystal of the second display structure that is corresponding to the green quantum rod unit 32 is 5V, the driving voltage of the liquid crystal of the first display structure that is corresponding to the red quantum rod unit 31 is 0V, and the driving voltage of the liquid crystal of the first display structure that is corresponding to the green quantum rod unit 32 is 5V.

When a blue screen is to be displayed: the driving voltage of the liquid crystal of the second display structure that is corresponding to the red quantum rod unit 31 is 5V, the driving voltage of the liquid crystal of the second display structure that is corresponding to the green quantum rod unit 32 is 5V, the driving voltage of the liquid crystal of the first display structure that is corresponding to the red quantum rod unit 31 is 0V, and the driving voltage of the liquid crystal of the first display structure that is corresponding to the green quantum rod unit 32 is 0V.

When a yellow screen is to be displayed (wherein yellow is the mixed color of red and green): the driving voltage of the liquid crystal of the second display structure that is corresponding to the red quantum rod unit 31 is 5V, the driving voltage of the liquid crystal of the second display structure that is corresponding to the green quantum rod unit 32 is 5V, the driving voltage of the liquid crystal of the first display structure that is corresponding to the red quantum rod unit 31 is 5V, and the driving voltage of the liquid crystal of the first display structure that is corresponding to the green quantum rod unit 32 is 5V.

When a purple screen is to be displayed (wherein purple is the mixed color of blue and red): the driving voltage of the liquid crystal of the second display structure that is corresponding to the red quantum rod unit 31 is 5V, the driving voltage of the liquid crystal of the second display structure that is corresponding to the green quantum rod unit 32 is 0V, the driving voltage of the liquid crystal of the first display structure that is corresponding to the red quantum rod unit 31 is 2.5V, and the driving voltage of the liquid crystal of the first display structure that is corresponding to the green quantum rod unit 32 is 0V.

When a cyan screen is to be displayed (wherein cyan is the mixed color of blue and green): the driving voltage of the liquid crystal of the second display structure that is corresponding to the red quantum rod unit 31 is 0V, the driving voltage of the liquid crystal of the second display structure that is corresponding to the green quantum rod unit 32 is 5V, the driving voltage of the liquid crystal of the first display structure that is corresponding to the red quantum rod unit 31 is 0V, and the driving voltage of the liquid crystal of the first display structure that is corresponding to the green quantum rod unit 32 is 2.5V.

According to FIG. 1, a color convertor in a display panel of the present embodiment, comprises: a display structure on the display panel comprising a liquid crystal layer, and a quantum rod layer on a side of the display structure distal to the display panel; the display panel is configured to convert an incident blue light ray into a linearly polarized blue light, and control a luminance of the first display structure; and the display structure is configured to receive the linearly polarized blue light that exits from the display panel, and change polarization state of the linearly polarized blue light incident to the quantum rod layer by controlling deflection angles of liquid crystals in the liquid crystal layer, to change a color of the light ray that exits from the quantum rod layer.

Optionally, the display panel may be the first display structure in the above embodiments. Furthermore, although both of the first display structure and the second display structure of the present embodiment have the function of liquid crystal deflecting, their operation principles are different, wherein the former employs the liquid crystal deflecting to control the luminance of the light ray, and its emergent light ray has the polarization state after passing through the polarization film, and the latter controls the polarization state of the light ray by the liquid crystal deflecting.

The above are preferable embodiments of the present disclosure. It should be noted that, for a person skilled in the art, various improvements and modifications can be made without departing from the principle of the present disclosure, and those improvements and modifications should be deemed as falling within the protection scope of the present disclosure.

What is claimed is:

1. A display panel, comprising:
a first display structure, comprising a first liquid crystal layer;
a second display structure, on the first display structure, the second display structure comprising a second liquid crystal layer; and
a quantum rod layer on a side of the second display structure distal to the first display structure; wherein:
wherein the first display structure is configured to convert an incident blue light ray into a linearly polarized blue light, and control a luminance of the first display structure by controlling deflection angles of liquid crystals in the first liquid crystal layer;
the second display structure is configured to receive the linearly polarized blue light that exits from the first display structure, and change polarization direction of the linearly polarized blue light incident to the quantum rod layer by controlling deflection angles of liquid crystals in the second liquid crystal layer;
the display panel comprises a plurality of pixels, a respective one of the plurality of pixels consisting of a first independently addressable subpixel and a second independently addressable subpixel, the first independently addressable subpixel and the second independently addressable subpixel are configured to display a full-color RGB pixel image;
the quantum rod layer in the first independently addressable subpixel consists of red light emitting quantum rods;
the quantum rod layer in the second independently addressable subpixel consists of green light emitting quantum rods;
a first color of light emitted from the red light emitting quantum rods of the first independently addressable subpixel is independently tunable by independently changing a first polarization direction of the linearly polarized blue light incident to the first independently addressable subpixel to a second polarization direction; and
a second color of light emitted from the green light emitting quantum rods of the second independently addressable subpixel is independently tunable by independently changing a third polarization direction of the linearly polarized blue light incident to the second independently addressable subpixel to a fourth polarization direction.

2. The display panel according to claim 1, wherein:
the display panel is absent of any polarizer between the second liquid crystal layer and the quantum rod layer.

3. The display panel according to claim 1, wherein,
the quantum rod layer comprises a red quantum rod unit and a green quantum rod unit;
the red quantum rod unit comprises a plurality of red quantum rods that are arranged in a first preset direction;
the green quantum rod unit comprises a plurality of green quantum rods that are arranged in a second preset direction;
when polarization directions of the linearly polarized blue lights that are incident to the red quantum rod unit and the green quantum rod unit are respectively perpendicular to arrangement directions of the quantum rods of the red quantum rod unit and the green quantum rod unit, both of the colors of the light rays that exit from the red quantum rod unit and the green quantum rod unit of the quantum rod layer are blue; and
when polarization directions of the linearly polarized blue lights that are incident to the red quantum rod unit and the green quantum rod unit are respectively parallel to arrangement directions of the quantum rods of the red quantum rod unit and the green quantum rod unit, the color of the light ray that exits from the red quantum rod unit of the quantum rod layer is red, and the color of the light ray that exits from the green quantum rod unit of the quantum rod layer is green.

4. The display panel according to claim 1, wherein the first display structure comprises:
a first substrate that is disposed on a first side of the first display structure;
a second substrate that is disposed on a second side of the first display structure, wherein the second substrate is arranged oppositely to the first substrate;
a first polarizer that is disposed on a first side of the first substrate;
a second polarizer that is disposed on a second side of the second substrate;
and
a first electrode assembly that is provided between the first substrate and the second substrate, wherein the first electrode assembly is used for controlling deflection angle of liquid crystal molecules of the first liquid crystal layer.

5. The display panel according to claim 4, wherein the first electrode assembly comprises:
a first pixel electrode and a first common electrode; and
the first pixel electrode is disposed on the side of the first substrate that is facing the first liquid crystal layer, and the first common electrode is disposed on the side of the second substrate that is facing the first liquid crystal layer; or
the first pixel electrode and the first common electrode are disposed on the side of the first substrate that is facing the first liquid crystal layer; or
the first pixel electrode and the first common electrode are disposed on the side of the second substrate that is facing the first liquid crystal layer.

6. The display panel according to claim 4, wherein the second display structure comprises:
a third substrate that is disposed on a first side of the second display structure;
a fourth substrate that is disposed on the second side of the second display structure, wherein the fourth substrate is arranged oppositely to the third substrate;
and
a second electrode assembly that is provided between the third substrate and the fourth substrate, for controlling deflection angle of liquid crystal molecules of the second liquid crystal layer.

7. The display panel according to claim 6, wherein the second electrode assembly comprises:
a second pixel electrode and a second common electrode; and
the second pixel electrode is disposed on the side of the third substrate that is facing the second liquid crystal layer, and the second common electrode is disposed on the side of the fourth substrate that is facing the second liquid crystal layer.

8. The display panel according to claim 6, wherein the second electrode assembly comprises:
a second pixel electrode and a second common electrode; and
the second pixel electrode and the second common electrode are disposed on the side of the third substrate that is facing the second liquid crystal layer.

9. The display panel according to claim 6, wherein the second electrode assembly comprises:
a second pixel electrode and a second common electrode; and
the second pixel electrode and the second common electrode are disposed on the side of the fourth substrate that is facing the second liquid crystal layer.

10. The display panel according to claim 6, wherein the second substrate also serves as the third substrate.

11. The display panel according to claim 1, wherein the quantum rod layer comprises a material selected from a group consisting of CdS, CdSe, CdTe, and ZnSe.

12. A display device, comprising the display panel according to claim 1.

13. The display device according to claim 12, further comprising:
a blue light backlight source to emit blue light to the first display structure.

14. A display method applied to a display panel:
wherein the display panel comprises:
a first display structure, comprising a first liquid crystal layer;
a second display structure, on the first display structure, the second display structure comprising a second liquid crystal layer; and
a quantum rod layer on a side of the second display structure distal to the first display structure; wherein:
wherein the first display structure is configured to convert an incident blue light ray into a linearly polarized blue light, and control a luminance of the first display structure by controlling deflection angles of liquid crystals in the first liquid crystal layer;
the second display structure is configured to receive the linearly polarized blue light that exits from the first display structure, and change polarization direction of the linearly polarized blue light incident to the quantum rod layer by controlling deflection angles of liquid crystals in the second liquid crystal layer;
the display panel comprises a plurality of pixels, a respective one of the plurality of pixels consisting of a first independently addressable subpixel and a second independently addressable subpixel, the first independently addressable subpixel and the second independently addressable subpixel are configured to display a full-color RGB pixel image;

the quantum rod layer in the first independently addressable subpixel comprises red light emitting quantum rods;

the quantum rod layer in the second independently addressable subpixel comprises green light emitting quantum rods;

a first color of light emitted from the red light emitting quantum rods of the first independently addressable subpixel is independently tunable; and a second color of light emitted from the green light emitting quantum rods of the second independently addressable subpixel is independently tunable;

wherein the method comprises:

converting a blue light ray that is incident to the first display structure into a linearly polarized blue light, and controlling at least one deflection angle of liquid crystals in the first liquid crystal layer of the first display structure, thereby controlling the luminance of the first display structure; and receiving the linearly polarized blue light that exits from the first display structure, and controlling at least one deflection angle of liquid crystals in the second liquid crystal layer of the second display structure, thereby controlling the polarization direction of the linearly polarized blue light that is incident to the quantum rod layer, to change a color of the light ray that exits from the quantum rod layer;

wherein controlling the polarization direction of the linearly polarized blue light comprises:

independently changing a first polarization direction of the linearly polarized blue light incident to the first independently addressable subpixel to a second polarization direction; and independently changing a third polarization direction of the linearly polarized blue light incident to the second independently addressable subpixel to a fourth polarization direction.

15. The display method according to claim 14, further comprising:

controlling the first display structure that comprises a plurality of first pixels, wherein at least one first pixel consists of two subpixels; and controlling the second display structure that comprises a plurality of second pixels, wherein at least one second pixel consists of two subpixels.

16. The display method according to claim 14, wherein converting a blue light ray that is incident to the first display structure into a linearly polarized blue light, and controlling the deflection angle of the liquid crystal of the first display structure, thereby controlling the luminance of the linearly polarized blue light that exits from the first display structure comprises:

converting the blue light ray that is incident to the first display structure into a linearly polarized blue light by using the polarizer of the first display structure, and by controlling voltages of a first pixel electrode and a first common electrode of a first electrode assembly, controlling the deflection angles of the liquid crystals, thereby controlling the luminance of the linearly polarized blue light that exits from the first display structure.

17. The display method according to claim 14, wherein controlling the deflection angle of the liquid crystal of the second display structure, thereby controlling the polarization direction of the linearly polarized blue light that is incident to the quantum rod layer, to in turn change a color of the light ray that exits from the quantum rod layer comprises:

by controlling voltages of a second pixel electrode and a second common electrode of a second electrode assembly, controlling the deflection angle of the liquid crystal of the second display structure, thereby controlling the polarization direction of the linearly polarized blue light that is incident to the quantum rod layer, to in turn change a color of the light ray that exits from the quantum rod layer.

18. The display method according to claim 17, wherein the quantum rod layer comprises a red quantum rod unit and a green quantum rod unit.

19. The display method according to claim 18, wherein controlling the deflection angle of the liquid crystal of the second display structure, thereby controlling the polarization direction of the linearly polarized blue light that is incident to the quantum rod layer, to in turn change a color of the light ray that exits from the quantum rod layer comprises:

controlling the liquid crystal of the second display structure that is corresponding to the red quantum rod unit to be deflected, to control a polarization direction of the linearly polarized blue light that is incident to the red quantum rod unit to be perpendicular to arrangement directions of the quantum rods of the red quantum rod unit, whereby the light ray that exits from the red quantum rod unit is blue.

20. A color convertor in a display panel, comprising:

a display structure on the display panel comprising a liquid crystal layer; and a quantum rod layer on a side of the display structure distal to the display panel;

wherein:

the display panel is configured to convert an incident blue light ray into a linearly polarized blue light, and control a luminance of the display structure; and the display structure is configured to receive the linearly polarized blue light that exits from the display panel, and change polarization direction of the linearly polarized blue light incident to the quantum rod layer by controlling deflection angles of liquid crystals in the liquid crystal layer;

the display panel comprises a plurality of pixels, a respective one of the plurality of pixels consisting of a first independently addressable subpixel and a second independently addressable subpixel, the first independently addressable subpixel and the second independently addressable subpixel are configured to display a full-color RGB pixel image;

the quantum rod layer in the first independently addressable subpixel comprises red light emitting quantum rods;

the quantum rod layer in the second independently addressable subpixel comprises green light emitting quantum rods;

a first color of light emitted from the red light emitting quantum rods of the first independently addressable subpixel is independently tunable by independently changing a first polarization direction of the linearly polarized blue light incident to the first independently addressable subpixel to a second polarization direction; and a second color of light emitted from the green light emitting quantum rods of the second independently addressable subpixel is independently tunable by independently changing a third polarization direction of the linearly polarized blue light incident to the second independently addressable subpixel to a fourth polarization direction.

* * * * *